United States Patent [19]

Tatsumi et al.

[11] Patent Number: 4,904,016
[45] Date of Patent: Feb. 27, 1990

[54] FRONT SPOILER ARRANGEMENT

[75] Inventors: Hisato Tatsumi; Kunio Sakai; Yukio Hamanoue, all of Yokohama; Satoshi Ishizuka, Zama, all of Japan

[73] Assignees: Nissan Motor Co., Ltd.; Ohi Seisakusho Co., Ltd., both of Yokohama, Japan

[21] Appl. No.: 49,486

[22] Filed: May 14, 1987

[30] Foreign Application Priority Data

May 16, 1986 [JP] Japan ................................ 61-112177

[51] Int. Cl.$^4$ ............................................. B62D 37/02
[52] U.S. Cl. .................................. 296/180.5; 293/117
[58] Field of Search .................. 293/117; 296/29, 190, 296/1 S, 180.1, 180.5

[56] References Cited

U.S. PATENT DOCUMENTS

| 3,618,998 | 11/1971 | Swauger | 296/1 S |
| 4,131,308 | 12/1978 | Holka et al. | 296/1 S |
| 4,159,140 | 6/1979 | Chabot et al. | 296/1 S |
| 4,398,764 | 8/1983 | Okuyama | 296/1 S |
| 4,659,130 | 4/1987 | Dimora et al. | 296/1 S |

FOREIGN PATENT DOCUMENTS

| 3512378 | 10/1985 | Fed. Rep. of Germany . |
| 55-135918 | 9/1982 | Japan . |
| 59-156875 | 9/1984 | Japan . |
| 2017023 | 9/1979 | United Kingdom ............... 296/1 S |

Primary Examiner—Russell D. Stormer
Attorney, Agent, or Firm—Foley & Lardner, Schwartz, Jeffery, Schwaab, Mack, Blumenthal & Evans

[57] ABSTRACT

A front spoiler arrangement installed at the front end section lower part of an automotive vehicle body. The front spoiler arrangement is comprised of a retractable spoiler fin supported by a pair of swingable arms which are spaced from each other and driven respectively by a pair of drive mechanism. Each swingable arm is securely connected at one end section thereof to the spoiler fin and at the other end section thereof to a rotatable drive shaft of each drive mechanism in such a manner that a mount rubber is interposed between the swingable arm and the drive shaft, thereby permitting lateral movement of the swingable arm relative to the drive shaft.

18 Claims, 6 Drawing Sheets

FIG.8
FIG.9
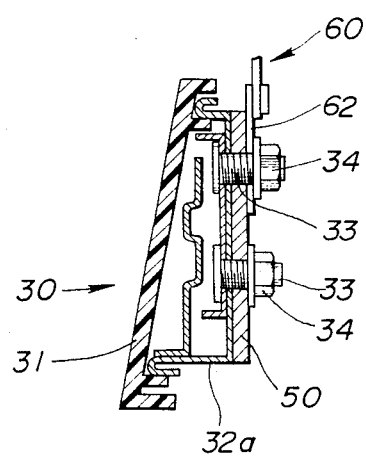
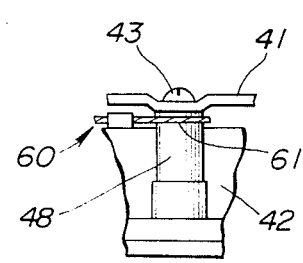

FRONT SPOILER ARRANGEMENT

BACKGROUND OF THE INVENTION

1. Field of the Invention

The present invention relates in general to a front spoiler arrangement installed at the front end section lower part of an automotive vehicle body, and more particularly to such a front spoiler arrangement of the type having a retractable spoiler fin which selectively takes an operative position and an inoperative position under control of a drive mechanism.

2. Description of the Prior Art

Recently a front spoiler arrangement has been equipped to automotive vehicles in order to improve aerodynamic characteristics of the vehicle. The front spoiler arrangement includes a spoiler fin installed at the front end section lower part of the vehicle body. There are two kinds of front spoiler arrangements, one of which is of the type wherein the spoiler fin is fixed in position and the other of the type wherein the spoiler fin is retractable. In the latter type front spoiler arrangement, the spoiler fin can be retracted, for example, during vehicle cruising at low speed or on rough road in which the front spoiler arrangement is substantially ineffective, thus preventing the spoiler fin from breakage due to striking against obstacles on road surface. Such a spoiler fin extends the width of the vehicle body and therefore is required to be supported in at least two positions in its longitudinal direction. In this connection, the spoiler fin is usually supported by two swingable arms which are spaced apart and whose rotation axes are aligned with each other. The two swingable arms are driven by two separately located drive mechanisms.

However, in such a retractable front spoiler arrangement, it is difficult to align the rotation axes of the swingable arms, thereby requiring high installation accuracy. This needs high cost parts and complicated assembly process and increases the number of assembly processes, thereby raising production cost of the front spoiler arrangement. Furthermore, if alignment of the rotation axes of the swingable arms are insufficient, the spoiler fin and the like deflects or breaks down and cannot make smooth projecting and retracting motions thereof. Moreover, such an alignment of swingable arm rotation axes makes the arrangement delicate and therefore misalignment of them tends to occur even in light collision against obstacles.

SUMMARY OF THE INVENTION

An automotive vehicle front spoiler arrangement according to the present invention is comprised of a spoiler fin movably disposed at the front end section lower part of a vehicle body and extends generally in the direction of width of the vehicle body. The spoiler fin selectively takes an operative position and an inoperative position. A plurality of swingable arms are provided to drive the spoiler fin from the operative position to the inoperative position, and vice versa. Each swingable arm is securely connected at one end section thereof to the spoiler fin and at the other end thereof to a rotatable drive shaft of each of a plurality of drive mechanisms in such a manner as to selectively take first and second positions which correspond respectively to the operative and inoperative positions of the spoiler fin. Each drive mechanism is so constructed and arranged that the drive shaft is rotated to cause the swingable arm to selectively take the first and second positions. Additionally, an elastic member is interposed between each drive shaft and the corresponding swingable arm to elastically support the swingable arm onto the rotatable drive shaft.

Accordingly, each swingable arm is kept movable laterally or allowed to make its fluttering movement relative to the drive shaft. This can effectively absorb the support error of the swingable arms to the spoiler fin which error is due to misalignment of the drive shafts of the plural drive mechanisms, thereby permitting tolerance to increase. Therefore, the front spoiler arrangement is prevented throughout its various sections from being deflected and receiving severe load. Furthermore, cost for improving installation accuracy is not required while accomplishing smooth operation of the spoiler fin, thus improving durability and operation performance of the front spoiler arrangement.

BRIEF DESCRIPTION OF THE DRAWINGS

FIG. 8 is a fragmentary vertical sectional view of a connecting structure of the spoiler fin relative to the swingable arm; and FIG. 9 is a fragmentary view of a connecting structure of an emergency coupler on the side of a vehicle body which coupler is used in the front spoiler arrangement of FIG. 1.

DETAILED DESCRIPTION OF THE INVENTION

Figure 1:
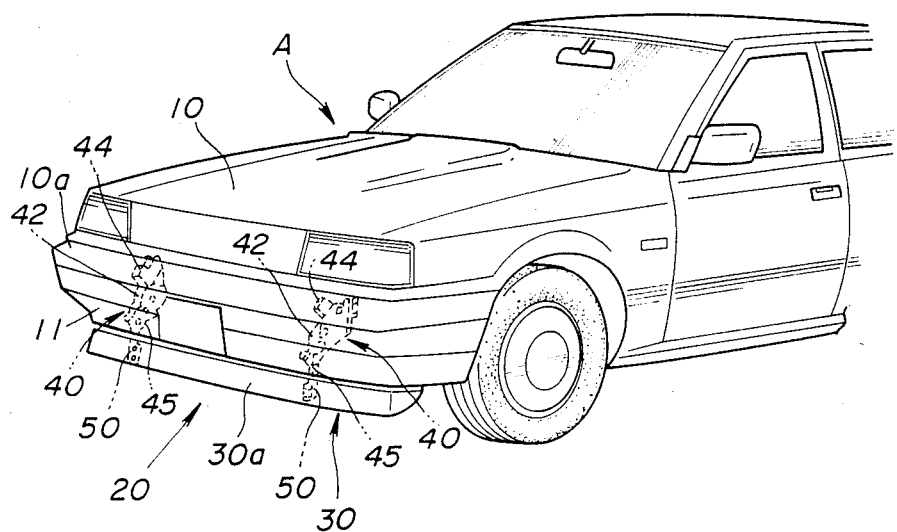
FIG. 1 is a fragmentary perspective view of a front section of an automotive vehicle equipped with an embodiment of a front spoiler arrangement according to the present invention, having a spoiler fin which is in an operative position.
Figure 2:
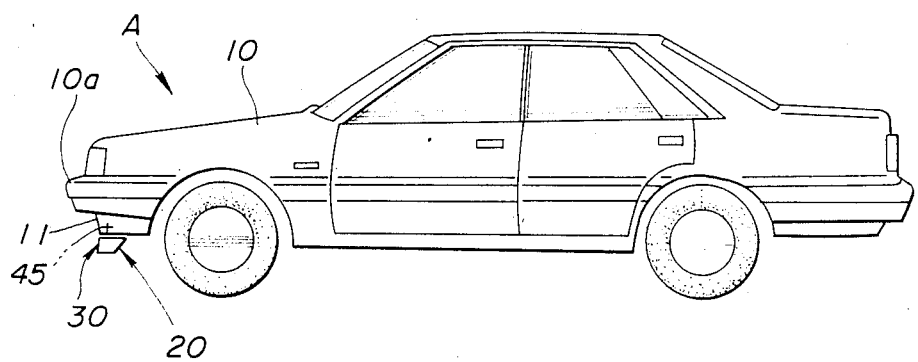
FIG. 2 is a side view of the automotive vehicle of FIG. 1.
Figure 3:
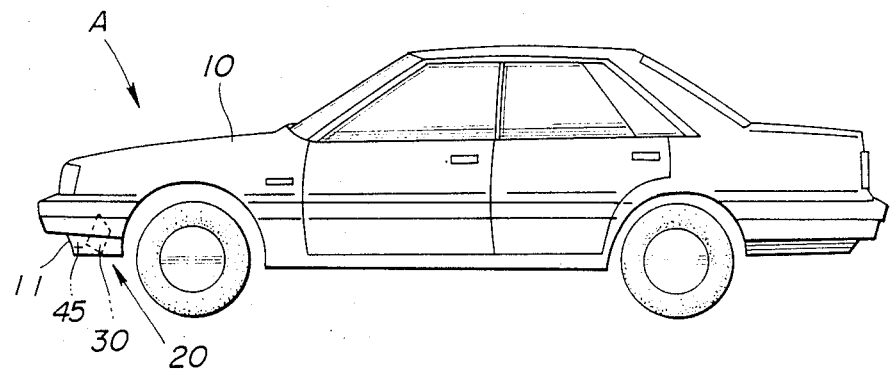
FIG. 3 is a side view similar to FIG. 2 but showing a state where the spoiler fin is in an inoperative position.

Referring to FIGS. 1 to 9, there is shown an embodiment of a front spoiler arrangement according to the present invention, for an automotive vehicle A. As shown in FIGS. 1 to 3, the front spoiler arrangement of this embodiment is installed at a front end section lower part of a vehicle body 10 of the automotive vehicle A. The front spoiler arrangement is comprised of a front spoiler fin 30 which is so arranged as to selectively take an operative or projected position as indicated in FIGS. 1 and 2 and an inoperative or retracted position as indicated in FIG. 3. In the operative position, the spoiler fin 30 is so located that its front surface 30a is planarly aligned with the surface of a bumper face section or skirt section 11 contiguous to a bumper 10a as shown in FIGS. 1 and 2. In the inoperative position, the spoiler fin 30 is located inside the bumper face section 11 as shown in FIG. 3. The spoiler fin 30 extends laterally or in the direction of width of the vehicle body 10 to reach the opposite sides of the vehicle body 10. The spoiler fin 30 is bent rearward near the opposite ends to form opposite bent sections (no numeral) extending rearward along the opposite sides of the vehicle body 10. As seen from FIGS. 6 to 8, the spoiler fin 30 includes a fin panel 31 which is securely supported by a reinforcement member 32 to which weld bolts 33, 33 are securely planted.

A pair of front spoiler drive mechanisms 40, 40 are provided to selectively put the spoiler fin 30 into the operative position and the inoperative position, i.e., to change the spoiler fin 30 from the operative position into the inoperative position, and vice versa. As shown in FIG. 1, the drive mechanisms 40, 40 are located inside the bumper 10a and side by side along the spoiler fin 30. The drive mechanisms 40, 40 are the same in construction. Each drive mechanism 40 includes a sealed housing 42 fixed to an installation plate 41 which is secured to the vehicle body 10. The installation plate 41 is formed with bent projections 41a, 41b, 41c to be secured to the vehicle body 10. An electric motor 44 is disposed in a rear end section of the housing 42 in such a manner that its upper section projects outward, maintaining a seal between the motor 44 and the housing 42. A rotatable drive shaft 45 is disposed in the housing 42 and projects out of the housing 42 to extend parallel with the direction of width of the vehicle body 10. Additionally, a speed reducing mechanism (not shown) is disposed within the housing 42 in such a manner as to mechanically connect the drive shaft 45 with the electric motor 44, so that rotational force of the motor 44 is transmitted to the drive shaft 45 upon rotational speed being reduced. A swingable arm 50 is connected at one end section 51 thereof with the drive shaft 45 and securely mounted on the drive shaft 45. The other end section of the swingable arm 50 is formed into the shape having a generally L-shaped cross-section and formed with a support plate portion 50a. The support plate portion 50a is formed with through-holes 50b, 50b in which the weld bolts 33, 33 of the reinforcement member 32 respectively locatable, so that the spoiler fin 30 is secured to the support plate portion 50a by fastening nuts 34, 34 engaged with the weld bolts 33, 33, respectively.

Figure 4:
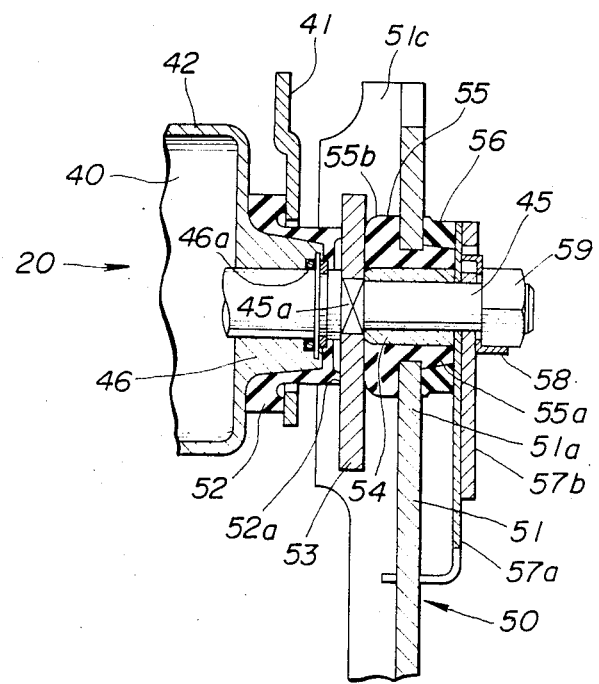
FIG. 4 is a fragmentary vertical sectional view of a support structure of a swingable arm relative to a drive mechanism of the front spoiler arrangement of FIG. 1.
Figure 5:
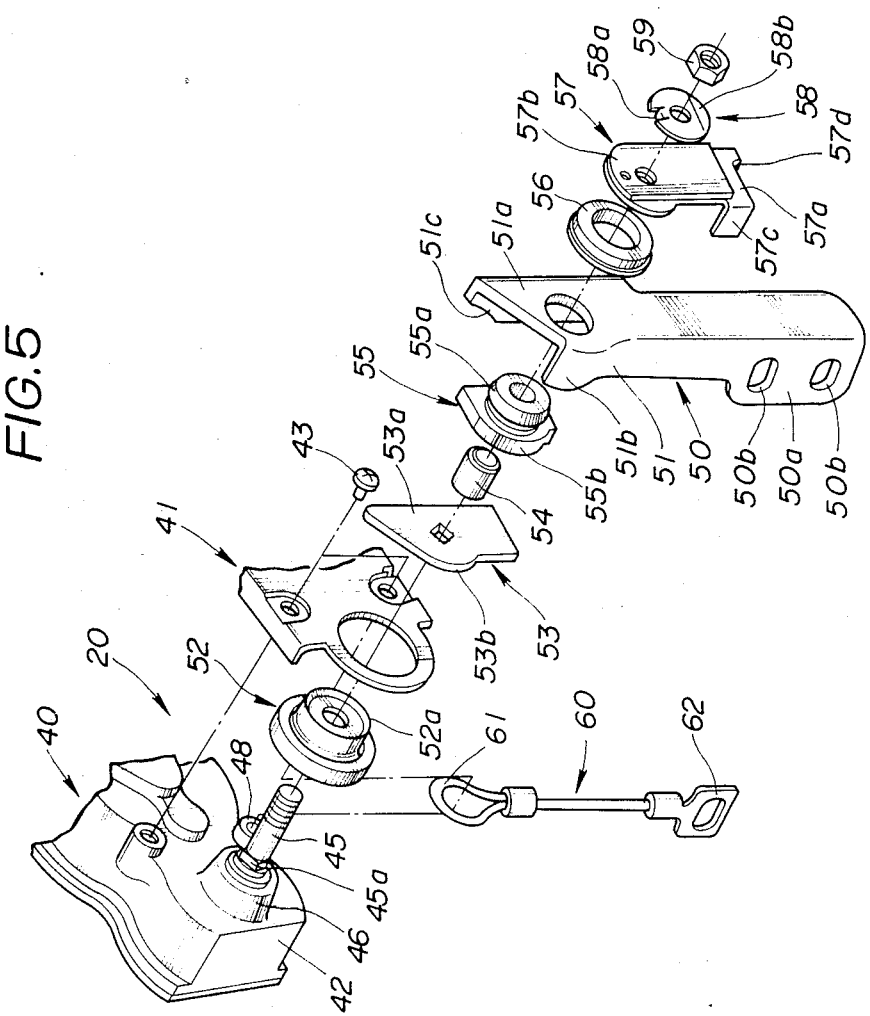
FIG. 5 is a fragmentary perspective exploded view of the support structure of FIG. 4.

Explanation of the manner for supporting the swingable arm 50 to the drive shaft 45 will be made with reference to FIGS. 4 and 5. The housing 42 is formed with a projected boss 46 for rotatably supporting the drive shaft 45. An 0-ring 46a is disposed between the inner peripheral surface of the boss 46 and the outer peripheral surface of the drive shaft 45. A seal cap 52 is disposed around the boss 46 and secured in position by interposing a part thereof between the side face of the housing 42 and the installation plate 41. The seal cap 52 is formed at its tip end with an annular seal lip 52a. A rotational force transmission plate 53 is formed at its central part with a square through-hole (no numeral) in which a four-cornered portion 45a of the drive shaft 45 is fitted. In this state, the seal lip 52a of the seal cap 52 is in press contact with the side surface of the rotational force transmission plate 53, thereby maintaining seal for the outer periphery of the drive shaft 45.

A cylindrical spacer 54 is disposed around the drive shaft 45 at a portion projected from the rotational force transmission plate 53. A cylindrical main mount rubber 55 is disposed around the spacer 54 in such a manner as to be coaxial with the drive shaft 45. The main mount rubber 55 consists of a cylindrical core section 55a and a generally annular flange section 55b which are integral with each other. The core section 55a is formed at its outer periphery with an annular groove (no numeral) in which the supportable plate portion 51a of the end section 51 of the swingable arm 50 is fitted. Additionally, a support mount rubber 56 is fittingly disposed around the tip end portion of the main mount rubber core section 55a in such a manner that the supportable plate portion 51a of the swingable arm 50 is put between the main mount rubber flange section 55b and the support mount rubber 56.

The swingable arm 50 is integrally formed with a flange 51b integral with the support plate portion 50a, and an engagement flange 51c integral with the supportable plate portion 51a. The flanges 51b, 51c extend parallel with the axis of the drive shaft 45 and located on the opposite sides of the drive shaft 45. The rotational force transmission plate 53 is interposed between the flanges 51b, 51c in a manner that the straight and curved opposite side edges 53a, 53b thereof are in contact with the inner surfaces of the flanges 51c, 51b, respectively. The outer surface of the flange 51c can be brought into contact with an elastic or elastomeric stopper 47 fixedly secured to the installation plate 41. The stopper 47 is generally of the rectangular prism shape having four flat surfaces. The flat surface 47a serves as an operative posit on stopper surface which is brought into engagement with the outer surface of the swingable arm engagement flange 51c when the spoiler fin 30 is in the operative position. Another flat surface 47b serves as an inoperative position stopper surface which is brought into engagement with the outer surface of the swingable arm engagement flange 51c when the spoiler fin 30 is in the inoperative position.

A support bracket 57 is mounted forward of the support mount rubber 56 in such a manner that the tip end section of the drive shaft 45 passes through an opening (no numeral) formed therethrough. The support bracket 57 is made up of an engagement plate 57a and a support plate 57b which are secured to each other as a one-piece member. The engagement plate 57a is in contact with the tip end of the support mount rubber 56 and formed with a pair of engagement projections 57c, 57d formed upon being bent. The swingable arm 50 is fittingly interposed between the engagement projections 57c, 57d, thereby preventing the support bracket 57 from shifting relative to the swingable arm 50 in the rotational direction of the swingable arm. The support bracket 57 is secured in position on the drive shaft 45 by tightening a fixing nut 59 through a lock washer 58 disposed between the support bracket 57 and the nut 59. The lock washer 58 is formed with an engagement projection 58a which is brought into engagement with an engagement hole (no numeral) formed in the support plate 57b of the support bracket 57. The lock washer 58 is further formed with a bent section 58b to support the nut 59, thereby preventing the nut 59 from rotation.

As seen from FIGS. 5, 6, 7 and 9, an emergency coupler 60 is provided to couple the end section of the swingable arm 50 with the side of the vehicle body 10. The emergency coupler 60 is made up of a wire cable (no numeral) whose one end is formed into the shape of loop to form a ring section 61. The other end of the wire cable is provided with a ring plate 62. The ring section 61 is installed to surround a screw boss 48 of the drive mechanism housing 42 located near the boss 46 for rotatably supporting the drive shaft 45. The ring section 61 is secured between the housing 42 and the installation plate 41 by tightening a screw 43 threaded into the screw boss 48. The ring plate 62 is secured to the spoiler fin 30 together with swingable arm 50 by tightening the nut 34 engaging with the weld bolt 33.

The manner of operation of the thus configured front spoiler arrangement 20 will be discussed hereinafter.

Although the front spoiler arrangement 20 is installed at a position in inferior circumstance or exposed to splashed muddy water, dust and the like, the essential part of the drive mechanism 40 is sealingly enclosed in the housing 42 and the drive shaft 45 projected from the inside of the housing 42 is sealed with the seal cap 52, thereby protecting the various mechanisms of the front spoiler arrangement 20 from the inferior circumstance.

During low speed vehicle cruising, for example, at urban area or on rough road, the front spoiler arrangement 20 is hardly effective and therefore the spoiler fin 30 is retracted into its inoperative position. In order to retract the spoiler fin 30 from the operative position indicated in FIGS. 1, 2 and 6, the electric motor 44 is first started to be rotated in a direction to put the spoiler fin 30 into its inoperative position. The rotation of the motor 44 is reduced in speed by the speed reducing mechanism and transmitted to the drive shaft 45. Then, the drive shaft 45 rotates counterclockwise in FIG. 6, and accordingly the rotational force transmission plate 53 rotates together with the drive shaft 45 like a one-piece member under the action of the four-cornered shaft portion 45a.

The swingable arm 50 rotates together with the drive shaft 45 and the rotational force transmission plate 53 like a one-piece member since it is securely engaged with the rotational force transmission plate 53 in a manner that the rotational force transmission plate 53 is interposed between the flange 51b and the engagement flange 51c. Accordingly, such rotation of the swingable arm 50 causes the spoiler fin 30 to rotate rearward upward. When the outer surface of the engagement flange 51c is brought into engagement with the inoperative position stopper surface 47b, the spoiler fin 30 is transferred to the inoperative or retracted position as shown in phantom in FIG. 6.

Figure 6:
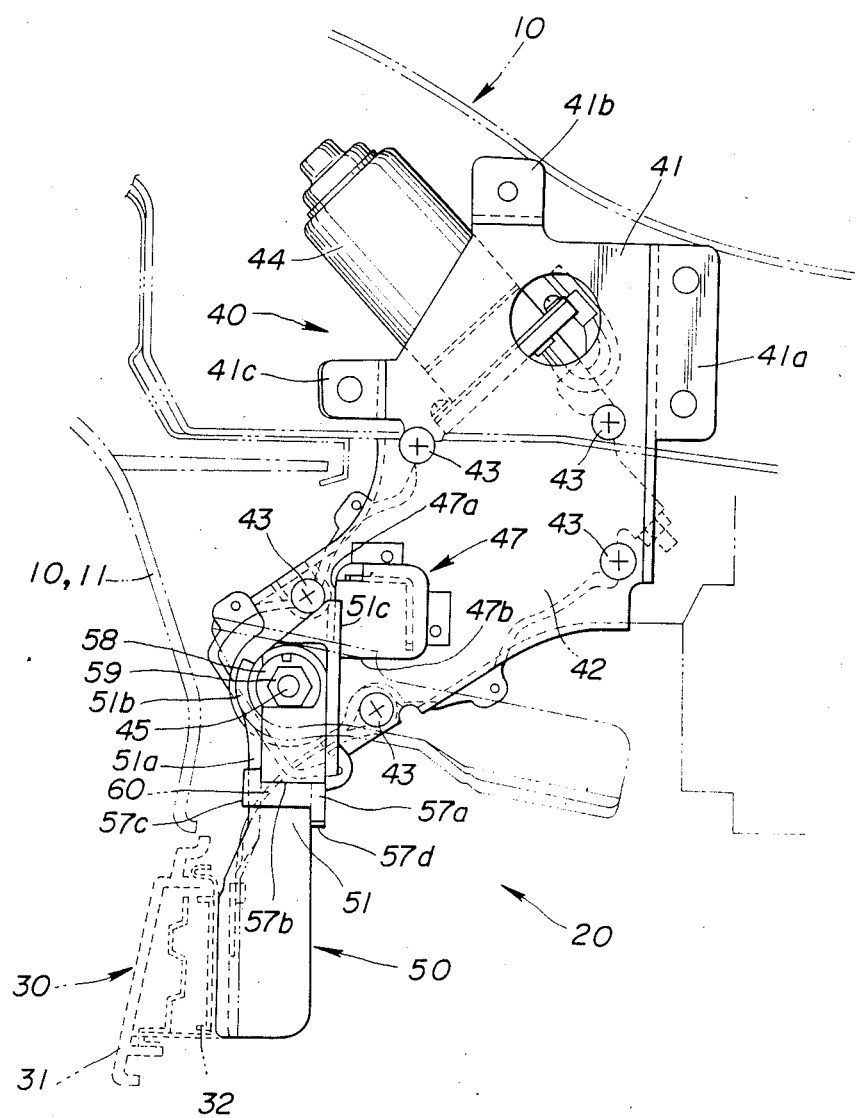
FIG. 6 is a side view of the drive mechanism of FIG. 4.
Figure 7:
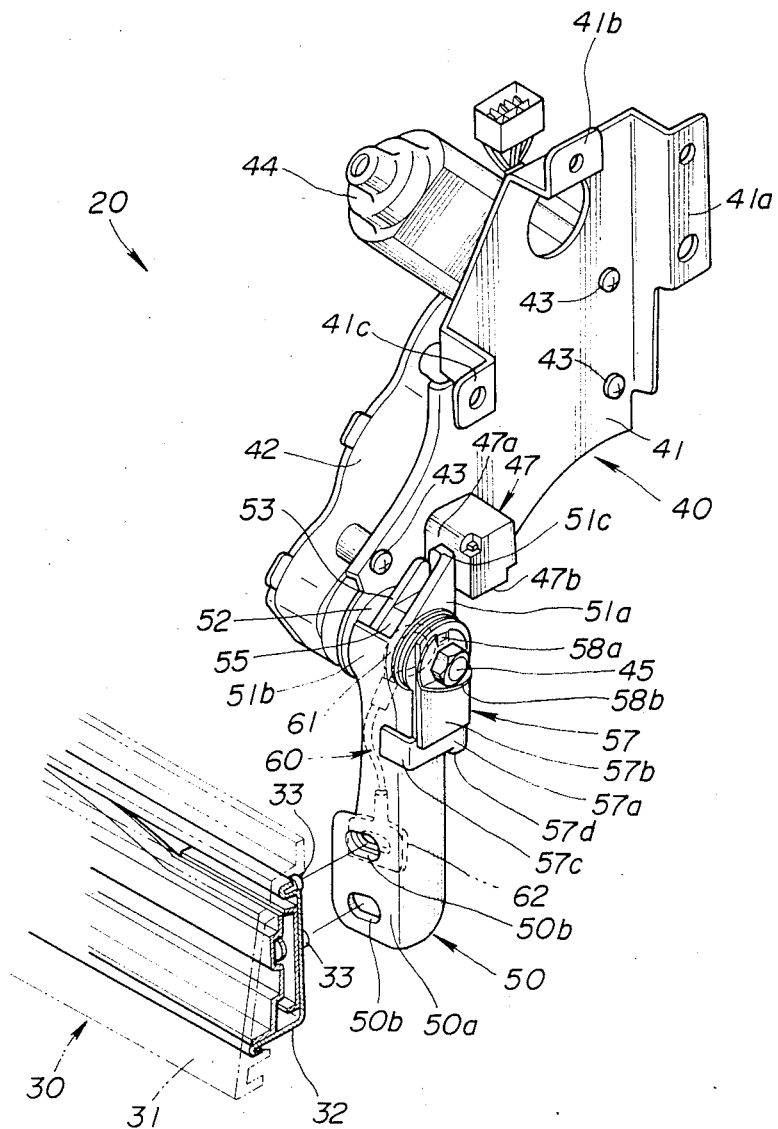
FIG. 7 is a perspective view showing an assembled state of the swingable arm and the drive mechanism of FIG. 4.

During high speed vehicle cruising, the spoiler fin 30 is projected into its operative position as shown in FIGS. 1, 2 and 6. This is accomplished by operating the motor 44 to rotate in the direction opposite to that during the above-discussed low speed vehicle cruising. Such rotation of the motor 44 causes the swingable arm 50 to rotate clockwise in FIG. 6, so that the spoiler fin 30 in the retracted position is swingingly moved toward the operative position. When the outer surface of the engagement flange 51c of the swingable arm 50 is brought into engagement with the operative position stopper surface 47a of the stopper 47, the spoiler fin 30 is transferred to the operative position. Thus, operation of the electric motor 44 causes the swingable arm 50 to swingingly rotate, thereby transferring the spoile fin 30 between the operative and inoperative positions.

Advantages of the present invention will be discussed hereinafter. Now, the above-discussed transferring operation of the spoiler fin 30 is made by the two drive mechanisms 40, 40, and therefore it is ideal that the rotatable drive shaft axes of the two drive mechanisms 40, 40 are axially aligned with each other. However, misalignment between them is unavoidable because the drive mechanisms 40, 40 are spaced and installed at separate positions, respectively.

The swingable arm 50 and the rotatable drive shaft 45 are considered to make a rigid-connection with each other in the sense of rotational force transmission, because the rotational force transmission plate 53 is fittingly interposed between the flange 51b and the engagement flange 51c of the end section 51 of the swingable arm 50. However, the swingable arm 50 is elastically connected through the main and support mount rubbers 55, 56 to the drive shaft 45, the rotational force transmission plate 53, and the support bracket 57, thus allowing the swingable arm 50 to laterally move within a range of elasticity of the mount rubbers 55, 56.

In case where the drive shafts 45, 45 of the drive mechanisms 40, 40 rotate in a misaligned state owing to installation error and the like during transferring operation of the spoiler fin 30 upon swinging movement of the swingable arm 50, the tip end sections of the swingable arms 50, 50 appear to relatively make their fluttering movement; however, the swingable arm tip end sections cannot actually flutteringly move since the swingable arms 50, 50 are fixed at their support plate portion 50a to the spoiler fin 30. Accordingly, the above-mentioned installation error and the like can be absorbed by relative movement between the drive shafts 45, 45 and the swingable arms 50, 50. In other words, if such relative movement is within the range of elasticity of the main and support mount rubbers 55, 56, the installation error and the like can be effectively absorbed by making lateral movement of the swingable arms 50, 50 relative to the rotatable drive shaft 45 of the drive mechanisms 40, 40.

The spoiler fin 30 of the front spoiler arrangement 20 is installed at the front end lower section of the automotive vehicle body 10 and therefore tends to strike against obstacles and particularly against various things in light collision. In such a case, there is possibility of the swingable arm 50 being broken upon load being concentrated to a section near the drive shaft 45. Thus, the swingable arm 50 may be broken upon once receiving of a high load, or receiving of repeated low loads.

Even in case where the swingable arm 50 is broken at the section near the drive shaft 45 so that its tip end section gets off, support of the spoiler fin 30 to the vehicle body side can be maintained though not sufficient under the action of the emergency coupler 60 whose ring section 61 is connected to the vehicle body side and whose ring plate 62 is connected to the spoiler fin side. This prevents the spoiler fin 30 from getting off from the vehicle body, thereby avoiding an accident.

What is claimed is:

1. A front spoiler arrangement for an automotive vehicle, comprising:
   a spoiler fin movably disposed at front end section lower part of a body of the vehicle and extending generally in direction of width of the vehicle body, said spoiler fin selectively movable to an operative position and an inoperative position;
   a plurality of swingable arms each of which has a first end section and a second end section, said second end section connected to said spoiler fin, each swingable arm being swingable and selectively taking first and second positions which correspond respectively to the operative and inoperative positions of the spoiler fin;
   a plurality of drive mechanisms each of which includes a rotatable drive shaft to which said swingable arm first end section is securely connected, and means for rotating said drive shaft to cause said swingable arm to selectively take first and second positions; and a plurality of elastic members each of which is interposed between said rotatable drive shaft and said swingable arm first end section so that said swingable arm is elastically mounted on said rotatable drive shaft each of said elastic members providing sufficient elasticity to enable lateral movement of said swingable arm proximate thereto to compensate for misalignment of said shafts.

2. A front spoiler arrangement as claimed in claim 1, further comprising means for transmitting rotational force of said drive shaft to said swingable arm.

3. A front spoiler arrangement as claimed in claim 1, further comprising means defining a space between peripheral surface of said drive shaft and a portion of the first end section of said swingable arm, said swingable arm first end section being connected through said portion with said drive shaft, said elastic member being located in said space.

4. A front spoiler arrangement as claimed in claim 2, wherein said swingable arm is formed at its first end section with an opening through which said drive shaft passes, periphery of said opening being spaced from peripheral surface of said drive shaft to define a space therebetween, said elastic member being located in said space.

5. A front spoiler arrangement as claimed in claim 4, wherein said rotational force transmitting means includes a rotational force transmission plate rigidly mounted on said drive shaft and securely engaged with said swingable arm first end section.

6. A front spoiler arrangement as claimed in claim 5, further comprising a support plate securely mounted on said drive shaft, and a spacer interposed between said rotational force transmission plate and said support plate, said elastic member and at least a part of said swingable arm first end section being disposed between said support plate and said rotational force transmission plate.

7. A front spoiler arrangement as claimed in claim 6, wherein said spacer is cylindrical and coaxially mounted on said drive shaft.

8. A front spoiler arrangement as claimed in claim 7, wherein said elastic member is cylindrical and coaxially mounted on said spacer.

9. A front spoiler arrangement as claimed in claim 8, wherein said swingable arm first end section is fitted at the periphery of the opening on said elastic member.

10. A front spoiler arrangement as claimed in claim 9, wherein said swingable arm first end section includes a plate-like portion which is perpendicular to axis of said drive shaft and is formed with the opening.

11. A front spoiler arrangement as claimed in claim 10, wherein said elastic member includes an elastomeric first mount member having an cylindrical section on which said swingable arm first end section plate-like portion is fittingly mounted, and a flange section radially extending from said cylindrical section, said flange section being interposed between said plate-like portion and said rotational force transmission plate, and an elastomeric annular second mount member coaxially mounted on said first mount member cylindrical section and fittingly interposed between said support plate and said plate-like portion.

12. A front spoiler arrangement as claimed in claim 1, wherein said drive mechanisms include first and second drive mechanisms disposed spaced apart from each other and side by side along the direction of width of the vehicle body.

13. A front spoiler arrangement as claimed in claim 12, wherein said drive shaft of each drive mechanism has an axis extending in the direction of width of the vehicle body.

14. A front spoiler arrangement as claimed in claim 1, wherein said spoiler fin is projectable out of the vehicle body in the operative position and retractable inside of the vehicle body in the inoperative position.

15. A front spoiler arrangement as claimed in claim 1, wherein said drive shaft is rotatable in a first direction in which said swingable arm is in the first position, and in a second direction opposite to the first direction, said swingable arm being in the second position in said second direction.

16. A front spoiler arrangement as claimed in claim 1, wherein said elastic member is made of elastomeric material.

17. A front spoiler arrangement as claimed in claim 1, further comprising means for mechanically connecting said swingable arm second end section to side of the vehicle body.

18. A front spoiler arrangement as claimed in claim 17, wherein said mechanically connecting means includes a wire cable having a first end section secured to said swingable arm second end section, and second end section secured to a housing of said drive mechanism.

* * * * *